May 20, 1947.　　　R. L. SHUEY　　　2,420,843
WHEEL TRUCK
Filed Sept. 25, 1945
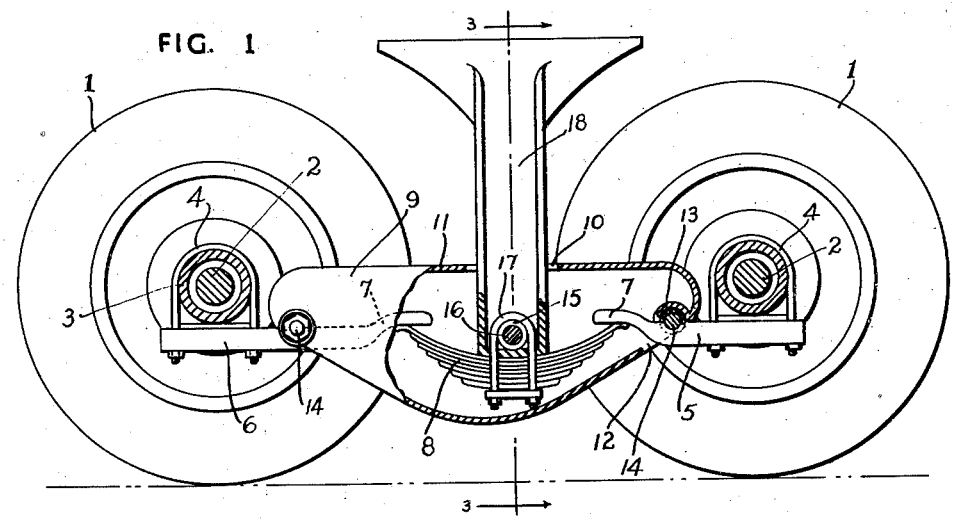
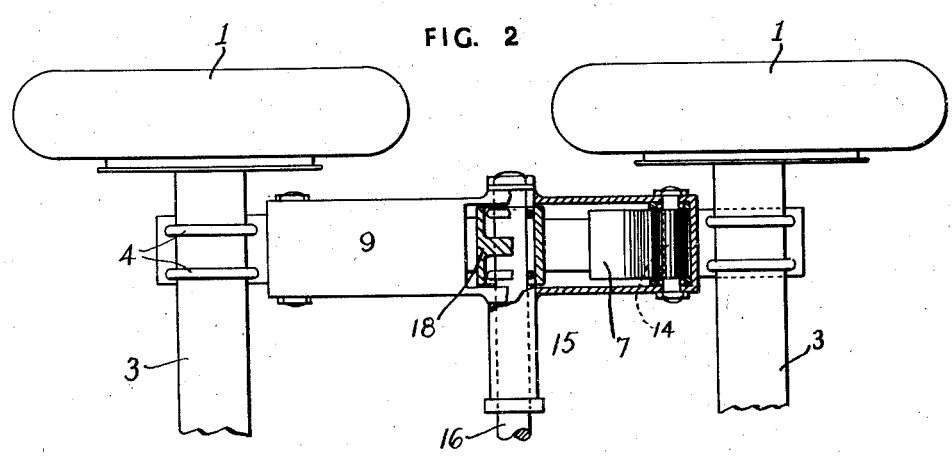
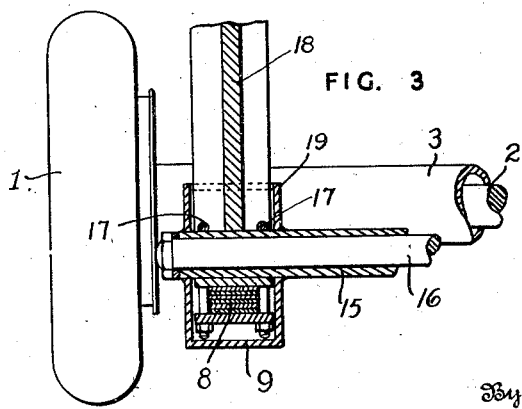
Inventor
ROBERT L. SHUEY, Patented May 20, 1947

2,420,843

UNITED STATES PATENT OFFICE 2,420,843

WHEEL TRUCK

Robert L. Shuey, Ellensburg, Wash.

Application September 25, 1945, Serial No. 618,454

3 Claims. (Cl. 280—104.5)

The present invention relates to wheel trucks wherein each wheel is independently and resiliently mounted so that the wheels are capable of individual movement in an up and down direction to adjust themselves to inequalities in the roadway.

The primary object of the invention is to provide a wheel truck of simpler and more compact construction than is employed in prior devices.

With the foregoing and other objects and advantages in view the invention consists of the novel construction and arrangement of parts hereinafter described and claimed.

In the accompanying drawings illustrating the invention.

Figure 1 is a side elevation of the wheel truck, partly in section.

Figure 2 is a top plan view of one side of the truck, partly in section.

Figure 3 is a vertical section on line 3—3 of Figure 1.

Like numerals in the description and drawings designate the same parts of construction.

1 designates the wheels of a vehicle, either truck or trailer type, and 2 the axles thereof. Secured to the underside of the axle housing 3, by suitable clips 4, are plates 5 and 6. These are adjacent the wheels and extend longitudinally of the truck. They are in alignment and project toward each other. They are provided with upwardly bent extensions or arms 7 adapted to rest on the ends of a leaf spring 8. A housing 9 constructed of suitable metal and provided with an opening 10 in its top wall 11 is adapted to be supported at its ends on the arms of plates 5 which project into the housing through openings 12 in the bottom wall thereof. This housing is mounted at its ends on ball or roller bearings 13 and secured in position by means of transverse bolts 14. It is also provided eccentrically with a tubular integral sleeve 15 which projects externally and is mounted revolvably on a cylindrical rod 16 which passes under the body of the vehicle.

The leaf spring 8 is secured by clips 17 to the underside of said sleeve and the latter is mounted in a depending hanger 18 which projects through the opening 10 of the housing and is secured to the underside of the vehicle. Said opening is located a suitable distance back of a median line between the front and rear wheels to bring the leaf spring and hanger nearer the back wheel. To facilitate this disposition of parts the extension on plate 5 is shorter than that on plate 6, as will be seen by reference to Figure 1. This places the weight of the load more on the rear wheels and tends to lift the front wheels, as hereinafter explained. The major portion of the foregoing description has been limited somewhat to one side of the truck but it will be understood that it also applies to the other side, the construction of both being identical.

In operation with a loaded trailer or truck, the center of the load is back of the center of the same. This imparts a climbing effect and in mud or on a soft road the vehicle stays on top instead of plowing downward through the surface of the road. When traveling down a steep incline the rear wheels will not slide as is the case with the conventional type of truck. In a trailer provided with this improved truck if the load is not properly distributed in relation to the truck still the wheels will stay in alignment. This is true where the load is not always in the same position. The resistance of the springs increases as the arms 7 bear down on it. As the spring is depressed the arms approach closer to the center of the spring, thus increasing its resilient support for the arms.

Having thus described my invention what I claim as new and desire to secure by Letters Patent, is:

1. In combination, vehicle wheels, spring members between said wheels, means for supporting the axles of the wheels on said spring members, box housings mounted on the means for supporting the axles on said spring members and adapted to be tilted at each end by the up and down movement of the wheels, each of said box housings being provided with an opening in the top wall and oppositely disposed openings in the bottom wall thereof, said means for supporting the axles on the spring members projecting through the oppositely disposed openings in the box housings, depending hangers extending through the openings in the top walls of said box housings and attached to the under side of the vehicle for supporting said spring members in position, and a transverse rod mounted rotatably in said housings and adapted to connect same and allow said tilting movement.

2. The vehicle wheel truck defined in claim 1, the said spring members being positioned so that the central portions thereof are offset with respect to the median line between the front and rear wheels.

3. In combination, vehicle wheels mounted on axles, leaf springs interposed between the front and rear wheels and arranged so that the central portions thereof are offset with respect to the median line between the front and rear wheels, plates attached to the underside of the axles and provided with lateral arms disposed toward each other and adapted to impinge the ends of said leaf springs, box housings journaled on said lateral arms and adapted to tilt at each end with the up and down movement of the wheels, each of said box housings being provided with an opening in the top wall and oppositely disposed openings in the bottom wall thereof, said lateral arms projecting through the oppositely disposed openings in said box housings, depending hangers extending through the openings in the top walls of said box housings and attached to the under side of the vehicle for supporting said leaf springs in position, and a transverse rod mounted rotatably in said housings and adapted to connect same and allow the tilting motion aforesaid.

ROBERT L. SHUEY.

REFERENCES CITED

The following references are of record in the file of this patent:

UNITED STATES PATENTS

| Number | Name | Date |
| --- | --- | --- |
| 1,745,088 | Fry | Jan. 28, 1930 |

FOREIGN PATENTS

| Number | Country | Date |
| --- | --- | --- |
| 380,295 | Great Britain | Sept. 15, 1932 |